Aug. 10, 1954  E. O. MARQUARDT  2,685,918
SAFETY CONTROL APPARATUS FOR FUEL BURNERS
Filed May 19, 1950  4 Sheets-Sheet 1

INVENTOR:
Edward O. Marquardt,
BY *Dawson, Orms, Roth and Spangenberg,*
ATTORNEYS.

Aug. 10, 1954  E. O. MARQUARDT  2,685,918
SAFETY CONTROL APPARATUS FOR FUEL BURNERS
Filed May 19, 1950  4 Sheets-Sheet 2
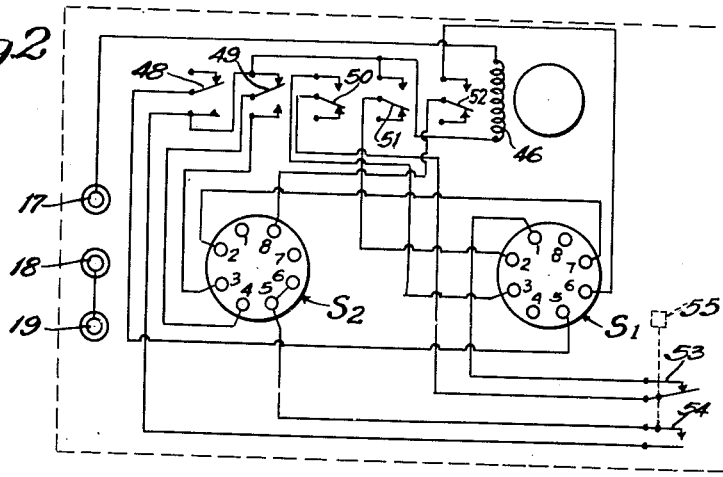
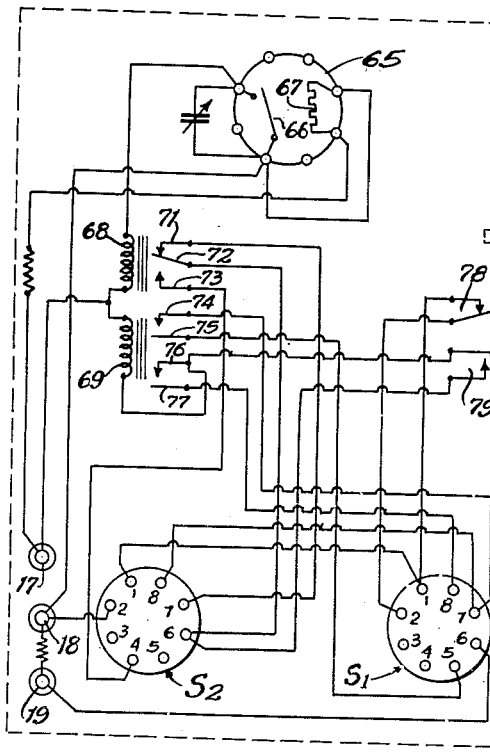
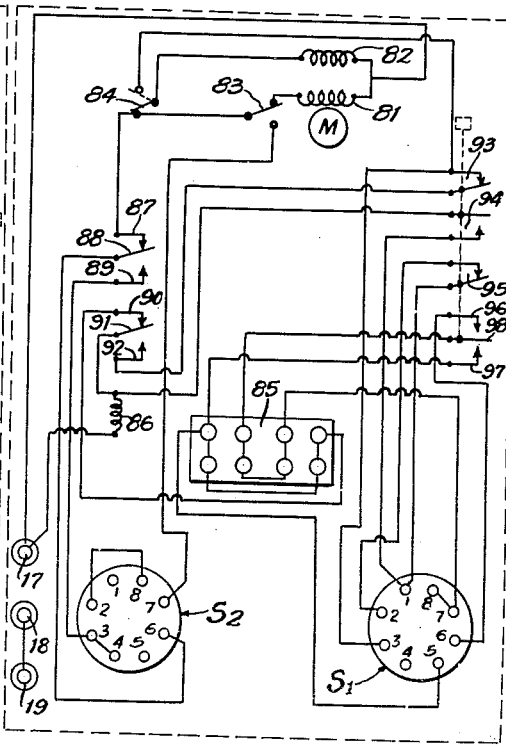
INVENTOR:
Edward O. Marquardt,
BY Dawson, Ooms, Booth and Spangenberg
ATTORNEYS.

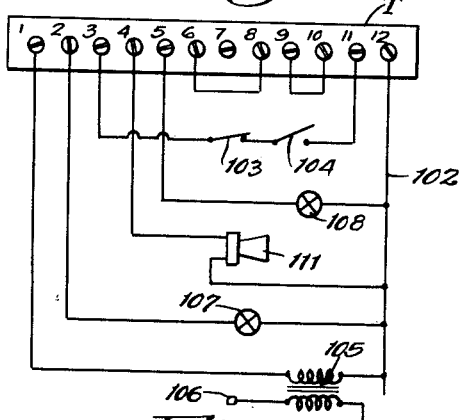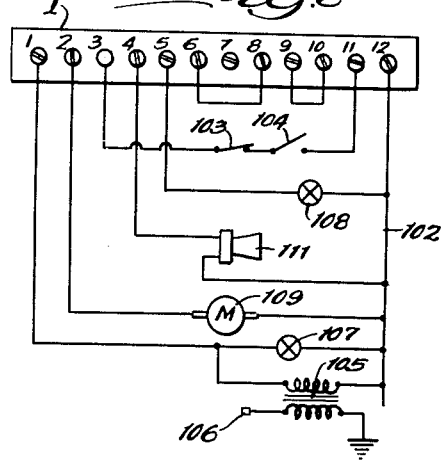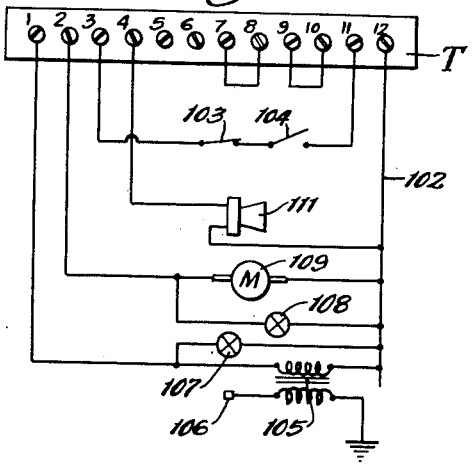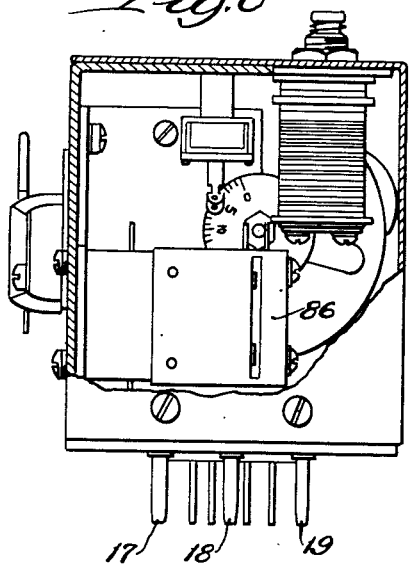

Aug. 10, 1954      E. O. MARQUARDT      2,685,918
SAFETY CONTROL APPARATUS FOR FUEL BURNERS
Filed May 19, 1950      4 Sheets-Sheet 4
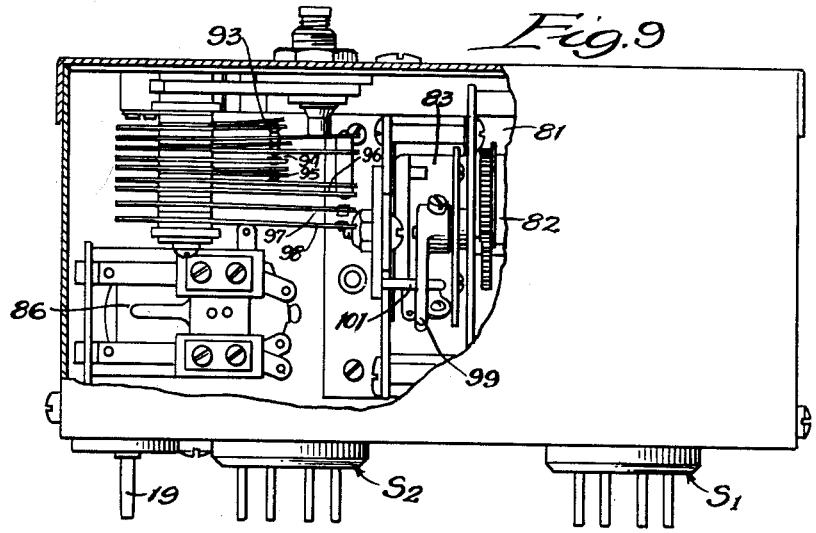
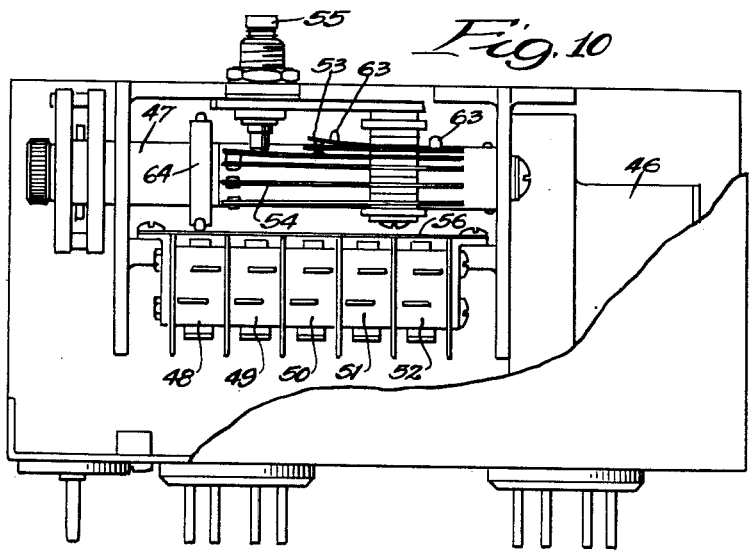
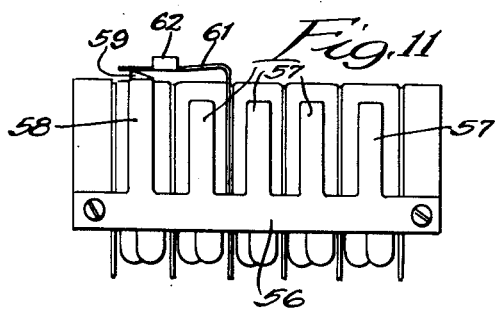
INVENTOR:
Edward O. Marquardt,
BY Dawson, Ooms, Brothers & Spangenberg,
ATTORNEYS.

Patented Aug. 10, 1954

2,685,918

UNITED STATES PATENT OFFICE 2,685,918

SAFETY CONTROL APPARATUS FOR FUEL BURNERS

Edward O. Marquardt, Chicago, Ill., assignor, by mesne assignments, to Barber-Colman Company, Rockford, Ill., a corporation of Illinois Application May 19, 1950, Serial No. 163,049

5 Claims. (Cl. 158—28)

This invention relates to control apparatus and more particularly to apparatus for controlling combustion.

In controlling burners of the type employing fluid fuels it is essential that adequate safeguards be provided to prevent accumulation of unburned fuel in the furnace. Such accumulations can arise due to failure of combustion or from failure of the control equipment itself and in either case can result in extremely hazardous conditions.

The present invention has for its principal object the provision of control apparatus in which supply of fuel will be prevented except under conditions favorable for combustion and in the event of any failure on the part of the control apparatus.

Another object is to provide control apparatus in which a pair of control relays are interlockingly connected through a time delay device. According to one feature this arrangement limits the time during which any device such as a pilot or fuel supply valve can be held open in the absence of combustion and insures adequate time to disperse or purge any accumulations of fuel before ignition can occur.

Still another object is to provide control apparatus in which a predetermined control cycle is carried out automatically to insure safe conditions prior to initiating an operation such as combustion. In addition any failure of the apparatus will act to prevent initiation of the operation.

A further object is to provide control apparatus in which a pre-operation to eliminate a possible hazardous condition is carried out prior to initiation of the control cycle. For example, in combustion control a definite purge period during which a purge blower may be operated is carried out before any fuel is supplied.

A still further object is to provide control apparatus in which different standard units can be assembled in different combinations to produce different types or cycles of control operations. In the preferred construction the apparatus includes a main chassis unit on which the principal control elements are mounted and which carries sockets detachably to receive panel or program units which carry control elements to predetermine the sequence or program of control operations. The chassis units may also be connected to different types of external wiring circuits depending upon the type of control to be effected and the program or sequence desired.

The above and other objects and advantages of the invention will be more readily apparent when read in connection with the accompanying drawings, in which—

Figures 2, 3 and 4 are diagrams of different types of panel or program units for use with the chassis of Figure 1;

Figures 5, 6 and 7 are diagrams of different external circuits for use with the chassis of Figure 1;

Figure 8 is a transverse broken away section of a physical panel unit corresponding to Figure 4;

Figure 9 is a side elevation with parts in section of the unit of Figure 8;

Figure 10 is a view similar to Figure 9 showing a physical unit corresponding to Figure 2; and Figure 11 is a partial view of the switch mounting and operating members of Figure 10.

Figure 1:
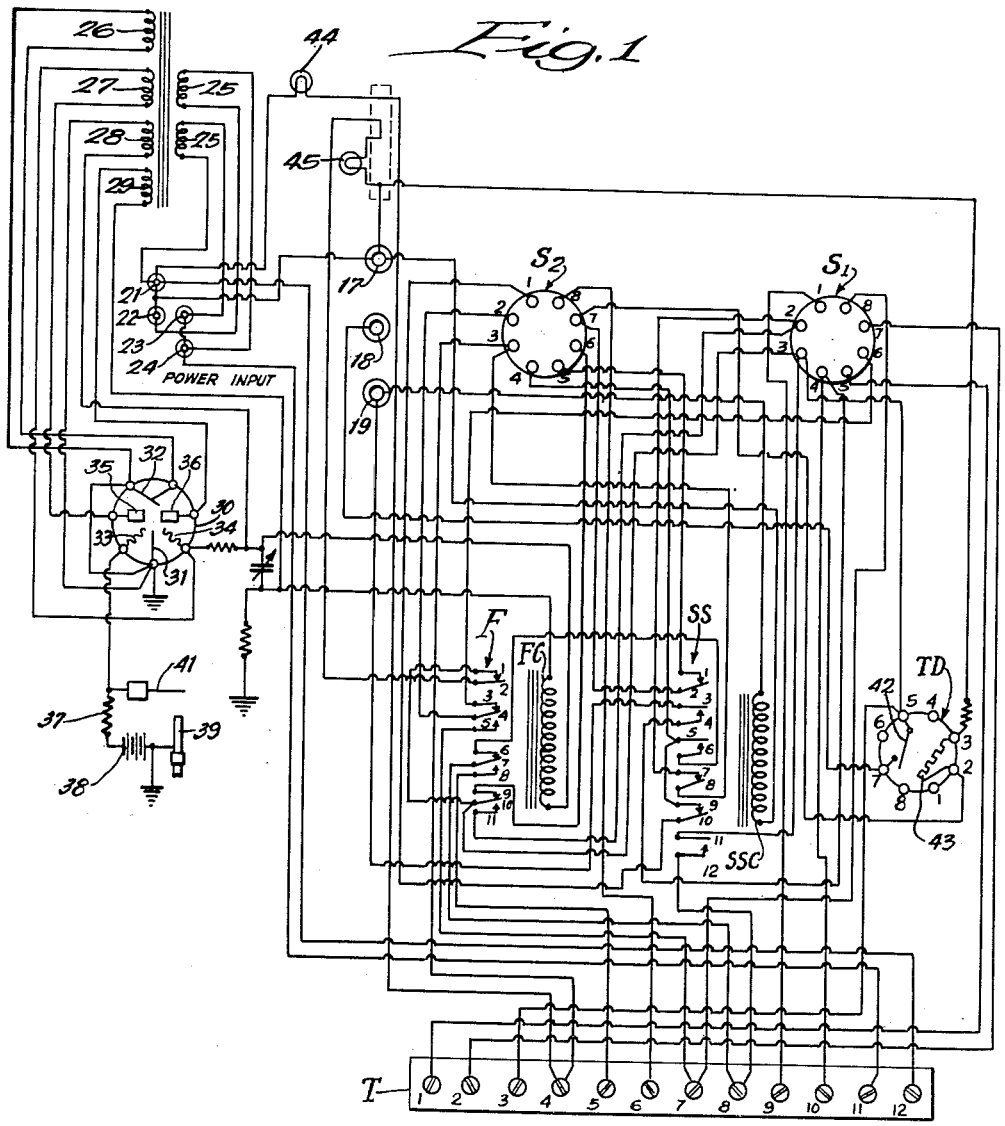
Figure 1 is a circuit diagram of a main chassis unit according to the invention.

The chassis unit as illustrated in Figure 1 is a universal chassis to cooperate with different types of panel units and different external circuits. The chassis includes a terminal block marked T and having twelve terminals thereon consecutively numbered and hereinafter designated T-1, T-2, etc. A pair of relays are on the chassis indicated generally at F (flame) and SS (safe start). The F relay has eleven contacts consecutively numbered and hereinafter designated F-1, F-2, etc. and which normally occupy the positions shown when the relay coil FC is de-energized. The contacts F-2, F-4, F-7, and F-10 are movable to be shifted downward from their illustrated positions when the coil FC is energized. The SS relay has twelve consecutively numbered contacts of which SS-2, SS-3, SS-5, SS-8, SS-10, and SS-11 are moved downward when relay coil SSC is energized.

To connect the chassis unit to panel units a plurality of socket type detachable connector elements are provided including a pair of sockets S1 and S2. Each socket has eight terminals consecutively numbered to receive prongs on a panel unit, and hereinafter designated S1-1, S1-2, S2-1, S2-2, etc. At one side of the sockets three individual sockets 17, 18 and 19 are provided to receive individual prongs on a panel unit.

The chassis is powered through four sockets 21, 22, 23 and 24 to receive prongs on a power connector unit. For a 115 volt source the sockets 21 and 22 and sockets 23 and 24 are connected as shown while for a 230 volt source the sockets 22 and 23 are connected. The sockets power primary windings 25 of a transformer having four secondary windings 26, 27, 28, and 29. The secondary windings supply a double triode tube 30 constituting a flame detector and having a common cathode 31 heated by a filament 32, a pair of control grids 33 and 34 and a pair of plates 35 and 36. The filament 32 is connected across the secondary winding 26 and to the cathode 31 which is grounded. The plate 35 is connected through the winding 27 to the grid 34 so that the two tube sections are in series. The winding 28 is connected between the cathode and grid 34 with a resistor in series with the grid and the winding 29 is connected to the plate 36 and to one side of the relay coil FC. The other side of the coil connects to the grid side of the winding 28, as shown so that when the tube is conducting the relay coil FC will be energized.

The tube is controlled in response to a condition affected by the apparatus, shown as the presence or absence of a flame. The grid 33 is connected through a resistance 37 to a bias source 38 and to ground. A grounded pilot burner 39 produces a flame which touches an electrode or flame sensing element 41 connected to the grid 33. When a flame is present the bias will be shunted to activate the flame detector, that is, to make the tube conductive, the resistance 37 being high relative to the flame resistance.

A time delay device or timing element is included in the chassis shown as a plug in unit TD having eight terminals. The device includes a bimetal switch 42, which, when heated, bridges the terminals TD–5 and TD–7. A heater 43 is connected between terminals TD–2 and TD–3 to heat the switch 42. The construction is such that the switch will close a predetermined time, for example sixty seconds, after the heater is energized and will remain closed a predetermined time, for example forty-five seconds, after the heater is de-energized. The interval for closing of the switch is chosen to be greater than the time required for the tube 30 to heat up so that the tube is always in conducting condition.

The time delay switch controls the SS relay in conjunction with a switch located externally of the chassis unit. For this purpose the terminal TD–5 is connected to T–3 and TD–7 is connected to socket 18. When T–3 is powered as hereinafter described and socket 18 is connected to socket 19 through the panel unit, the SS relay will be energized whenever the time delay switch is closed. This relay will also be energized through a holding circuit established in somewhat different ways when different panel units are employed.

The chassis unit preferably also includes a red signal light 44 and a green signal light 45. The several terminals, switch contacts, sockets, etc. on the chassis unit are interconnected as shown in Figure 1. These individual connections will not be described in detail but the manner of making the connections and their purposes will be clear from the description of the operation hereinafter.

Referring now to Figure 2, there is shown one type of panel unit for automatically carrying out a preset cycle or program of operations and to produce a shut down in case of flame failure. This unit includes prong connectors to interfit with the sockets S1, S2, 17, 18, and 19 and which, for convenience in following the circuits, have been designated by the same reference characters. A motor 46 drives a cam shaft 47 (Figure 10) having cam projections thereon to operate a series of switches 48, 49, 50, 51 and 52. There is also a normally closed switch 53 and a normally open switch 54 operated by a manual push button 55. These switches are so arranged that when the push button is depressed the switch 53 will open before the switch 54 closes. The switches 48 to 52 normally occupy the positions shown and are moved by the cam projections at times and for intervals determined by the placing and adjustment of the cam projections on the shaft 47.

In the panel unit construction, as shown in Figures 10 and 11, the switches 48 to 52 are cam operated switches and are mounted in alignment parallel to the axis of the cam shaft 47. To operate the switches a thin metal plate 56 is mounted above the switches and is formed with a series of flexible fingers 57, one extending over each of the switches. All of the fingers terminate above and short of the ends of the respective switch unit with the exception of the finger at the extreme left of the assembly indicated at 58. This finger turns downward at the end of its switch and is provided with a short outwardly projecting flange 59 to be engaged by a flexible latching bar 61. The latching bar extends across the face of the switch assembly and is provided with an upwardly projecting finger 62 to be engaged by a cam projection on the cam shaft.

The cam shaft 47 carries a series of projecting screws 63 to register with the fingers 57 and which are adjustably threaded into the shaft to time the operation. As the shaft turns the screws will wipe across the fingers 57 to depress them thereby to depress the push buttons on the corresponding switches.

The finger 58 is engaged by similar screw projections on a collar 64 carried by the cam shaft 47. The collar carries two projections spaced apart as shown, one of which wipes across the finger 58 to depress it and operate its corresponding switch. As soon as the finger 58 is depressed, the latch strip 61 will spring in over the flange 59 to hold the finger depressed until the latch is released. As the cam shaft and collar continue to rotate, the second screw on the collar will engage the finger 62 to move the latch outward and release the finger 58. This construction enables the switch 48 to be held closed for a predetermined adjustable interval.

The panel unit of Figure 3 is generally similar to that of Figure 2 with variations to produce a different sequence of control operations. This panel unit mounts on the chassis in the same manner as the panel unit of Figure 2 and its corresponding prong connectors have been designated by the same reference numerals as the sockets in Figure 1 with which they engage.

The panel unit of Figure 3 includes a time delay device 65 of the same general type as the device TD. As shown, this device comprises a bi-metal switch 66 which is normally open and which closes when heated by a heating element 67 after a predetermined time interval. This switch will also remain closed for a predetermined interval after the heating element 67 is de-energized.

A lock-out type relay is provided on the panel including a lock-out winding 68 and a reset winding 69. The relay comprises a number of switch contacts 71, 72, 73, 74, 75, 76, and 77 which normally occupy the positions shown. When the lock-out coil 68 is energized the movable contact 72, 74, and 76 will be moved downward and will be held downward mechanically regardless of de-energization of the coil 68 until the reset coil 69 is energized. The relay also includes a double mechanical switch including a normally closed switch 78 and a normally open switch 79. The switches 78 and 79 are operated by a button simifar to the switches 53 and 54 of Figure 10 so that when the button is manually depressed the switch 78 will be opened and the switch 79 will be closed.

Figure 4 shows still another panel unit for use with the chassis of Figure 1, and again the prong connectors thereon which interfit with the sockets on the chassis unit have been designated by the same reference numerals for convenience in reading the circuits. This unit comprises a motor 81 and a magnetic clutch having an energizing winding 82. The motor is utilized to time a purge cycle and is connected through the clutch when it is energized to a cam shaft driving a cam which operates a switch 83. The switch 83 is normally in the position shown and is shifted downward to connect it to the terminal 82–7 when the cam has been driven to a predetermined position by the motor. The clutch may be controlled by a manual selector switch 84 which will cause a purging operation each time the device operates when it is in the position shown but which will produce only an initial purging operation when moved upward to the dotted line position. This panel includes a terminal block 85 to which various jumpers can be attached for changing the cycle of operations. There is also a relay having a coil 86 controlling a plurality of switches including contacts 87, 88, 89, 90, 91 and 92. These switches normally occupy the illustrated position, and when the coil 86 is energized the movable contacts 88 and 91 are moved downward. There is also a manual push button switch including a normally closed switch 93, a normally open switch 94, a normally closed switch 95 and a double pole switch having fixed contacts 96 and 97 and a movable contact 98.

The physical construction of the panel unit of Figure 4 is illustrated in Figures 8 and 9. As shown therein the unit is mounted in a casing with the prong connectors projecting from one side thereof to fit into the sockets on the chassis unit. The motor 81 and clutch 82 are mounted in one end of the housing, and the clutch drives a spring loaded shaft having a finger 99 thereon. The finger 99 is normally pressed against a fixed stop 101 by a spring, and when the clutch is engaged is driven around to engage and operate the switch 83. When the clutch is released, the finger will return to its initial position, but as long as the clutch is engaged the finger will be connected to the motor to throw the switch 83 downward from its position illustrated in Figure 4.

Figures 5, 6, and 7 illustrate three different external circuits used with the chassis and the several panels to produce different types of control combinations. The external circuits are connected to the terminals on the terminal panels T as shown in each of the figures. In each case there is a common power line 102 connected to the terminal T–12 which in turn is directly connected to the socket 21, as shown in Figure 1. The terminal T–11 connects directly to the other side of the line, as shown in Figure 1, through its connection to the socket 24. The terminal T–11 is adapted to be connected in each case to the terminal T–3 to initiate the operation through limit and control switches 103 and 104. Since these parts as so far described are identical in all of the external circuits, they are indicated by the same reference numbers. The switch 103 in each case is a normally closed limit switch which opens when the temperature or other condition being controlled exceeds a predetermined maximum desired value but which remains closed under all normal operating conditions. The switch 104 is the main control switch which will close when the temperature or other condition falls below the set point and which will open when the temperature is above the set point. Thus closing of the switch will initiate operation of the apparatus and its opening will in all cases terminate the operation.

In the external circuits, as illustrated, a fuel supply valve is adapted to be controlled and to be ignited through a pilot valve which is in turn lighted by a spark plug or the like. In each case, as shown, there is an ignition transformer 105 connected between the line 102 and the terminal T–1 and having its secondary connected to an igniting device indicated generally at 106. The igniting device may be a spark plug which will produce a spark to ignite the fuel flowing from a pilot burner whenever the igniting transformer is energized. The pilot valve is indicated generally at 107 and is an electrical type of valve which will be opened when energized and closed when de-energized. In Figure 5 the pilot valve is connected between the line 102 and the terminal T–2 to be separately controlled, whereas in both Figures 6 and 7 the pilot valve is connected in parallel with the transformer 105 to be energized simultaneously with the transformer. Each of the circuits also includes a main fuel valve 108 which will open when energized to supply fuel to the main burner and will close when de-energized. In both Figures 5 and 6 the main valve is connected between the common line 102 and the terminal T–5, while in Figure 7 the main valve is connected between the common line and the terminal T–2. Figure 7 also includes a motor 109 in parallel with the main valve 108 to produce a flow of combustion air through the heating plant. Figure 6 shows the motor 109 connected in an independent circuit between the common line 102 and the terminal T–2 so that the motor can be independently energized for a purging operation. The circuit of Figure 5 does not employ a motor. Each of the circuits also includes an alarm device illustrated as a horn 111 connected between the common line 102 and the terminal T–4 to produce an audible signal when energized.

One desirable control apparatus is formed by connecting the panel unit of Figure 2 to the chassis unit and employing the external wiring circuit illustrated in Figure 7. This unit will attempt to relight the flame if it should become accidentally extinguished and provides a definite program control through the motor 46 and the cam operated switches controlled thereby.

Assuming that the apparatus is cold when power is first applied by plugging a connector into the sockets 21—24, the primary windings 25 of the transformer will be energized, and the filament of the tube 32 will start to heat. A circuit will also be completed through the green pilot light 45 from the socket 21 to the socket 17 through the pilot light 45 and normally closed relay contacts F1 and F2 to the socket S1–3 to the terminal T–3 and from it through the closed switches 103 and 104 to the terminal T–11 and the socket 24. Therefore, the green pilot light will be energized. At the same time the heater 43 of the time delay device TD will be energized from the socket 21 to socket 17 to the terminal TD–3 through the heater to TD–2 to the terminal S2–7 through the normally closed contacts SS–1 and SS–2 to the terminal S2–5 which is bridged in the panel unit to the terminal S2–6 as shown and from this terminal through the normally closed relay contacts F9 and F10 to the socket S1-3 and from it to the terminal T-3 and the other side of the line as described above. At this time the heater 43 commences to heat and will close the switch 42 after a predetermined time interval.

This initiates the proving operation which serves to check the flame relay for false actuation. If the F relay should be prematurely energized at this time due, for example, to a short circuit or to leakage in the flame electrode circuit, it will open the normally closed contacts F-9 and F-10 to interrupt the heater circuit and to stop the sequence of operation. At the same time operation of this relay will light the red pilot light 44 through a circuit from the socket 21 through the red pilot light to the terminal T-4 to the socket S2-3 through the normally closed contacts SS7-8 to the socket S1-2 through the normally open contacts F-10 and F-11 to the socket S1-3 and the other side of the line as above described. At the same time the alarm 111 will be energized from the socket 21, terminal T-12 and common lead 102 through the alarm to the terminal T-4 and through the remainder of the circuit as described above in connection with the red pilot light. Thus the red pilot light and sounding of the alarm indicate an unsafe condition and the fuel valve switch contacts SS11 and SS12 remain open so that the fuel valves cannot be opened because the heater 43 is deenergized and the switch 42 fails to close to energize the SS relay.

It is also to be noted that operation of the manual switches before the proving period is completed and the time delay switch 42 closes cannot open the fuel valves and will only result in interrupting the operation and energizing the red pilot light. Operation of the manual switches to close the switch 54 will complete a circuit through the motor 46 to close the switch 51. This will complete a circuit through the red pilot light and alarm as above described and will simply result in locking the system in its existing condition without ever enabling the fuel valves to open. When the manual switch is returned to its initial condition, the motor programing unit will return to its illustrated position so that the circuit is ready to operate in its normal manner.

If the relay F is not accidentally energized as described above, the heater 43 will continue to heat until it closes the switch 42. This operation is timed to take longer than the interval required to heat up the tube 30 so that if a dangerous condition exists the tube 30 will always detect it before the time delay switch 42 is closed. Closing of the switch 42 energizes the SS relay from the socket 21 to socket 17 to the bottom side of the coil SSC through the coil to the socket 19 through the jumper on the panel unit to the socket 18 through the delay switch 42 to the terminal T-3 through the switches 103 and 104 to the terminal T-11 and the other side of the line. At this time the SS relay operates and will be held temporarily operated as long as the time delay switch is closed or until a flame is established.

Closing of the SS relay starts the motor 46 through a circuit from the socket 21 to socket 17 through the motor through the switch 49 to the terminal S2-4 through the relay contacts SS5 and SS6 and the normally closed contacts F-6 and F-7 to the terminal T-8 through the contacts SS11 and SS12 to the socket S1-3 thence through the terminals TD-5 and T-3 to the other side of the line. Thus at this time the motor 46 is started to control the switches 48 to 52 in the desired cycle. In this cycle the switch 52 closes almost immediately and remains closed until near the end of the cycle. The switch 51 remains open for a short period and then closes to remain closed throughout the cycle. The switch 50 closes shortly after the start of the cycle and remains closed throughout the cycle. The switch 49 remains in its upper position as shown through most of the cycle and moves to its lower position toward the end of the cycle and then returns to its upper position. The switch 48 can be adjusted as described above to close at any predetermined period after the start of the cycle and to remain closed as long as desired but to reopen prior to termination of the cycle.

With the switch 48 moved downward to its closed position the ignition transformer and pilot valve will be energized through a circuit from the common lead 102 to the terminal T-1 to the socket S1-5 through the switch 48 through the switch 49 to the socket S2-4 through the relay contacts SS-5 and SS-6 through the normally closed contacts F-6 and F-7 to the terminal T-8 and through the contacts SS11 and SS12 to the socket S1-3 and the other side of the line. Thus at this time the pilot valve will be opened and the ignition device will be energized to ignite the fuel at the pilot valve. If the fuel fails to ignite within the ignition period when the time delay switch 42 is closed, this switch will open to deenergize the SS relay and the system will then be locked-out.

Assuming, however, that a flame is established at the pilot valve which is the normal condition, the tube 30 will be made conducting to energize the F relay as above described. With this relay energized the main fuel valve 108 and the motor 109 will be energized through a circuit from the common lead 102 to the terminal T-2 to the socket S1-7 through the panel wiring to the socket S2-2 through the relay contacts F-4 and F-5 to the terminal T-7 through the jumper to the terminal T-8 through the relay contacts SS11 and SS12 to the socket S1-3 and the other side of the line. At this time the main valve is opened.

Energizing of the F relay will cut off the pilot valve and ignition transformer through opening of the normally closed contacts F-6 and F-7 and will also extinguish the green pilot light by opening the contacts F-1 and F-2. The motor 46 will continue to run until it is stopped by opening of the switch 50 at which time the several switches 48 to 52 are returned to their initial position ready for a subsequent operation.

It will be noted that all of the circuits as described for operation are connected to the socket S1-3 which is connected to the terminal T-3 which is in turn connected to the terminal T-11 and the other side of the line through the control switches 103 and 104. As long as these switches are closed to indicate a demand for heat and an operation within the safe range, the burner will continue to operate. However, as soon as the switch 104 reopens indicating that the demand for heat has been satisfied the entire apparatus will be de-energized and will be returned to its initial condition ready to start up again on a subsequent demand for heat.

When the apparatus is assembled by using the panel unit of Figure 3 and the external circuit of Figure 6, a somewhat different control will be provided for automatic lighting and purging of the apparatus prior to starting up. In this circuit the time delay heater 43 is energized through relay switches on the panel unit as well as through normally closed contacts on the F relay. In the circuit, as shown, the terminal TD-2 is connected to the socket S2-7, through the relay switch contacts 71 and 72 to the terminal S2-6, and through the normally closed contacts F-9 and F-10 to the socket S1-3 and the other side of the line. Thus, the heater of the time delay device cannot be energized when the relay of the panel unit is in its energized or locked-out condition. In normal operation, however, this relay is de-energized so that the switch 71, 72 is closed.

Assuming a satisfactory proving operation with the relay F remaining de-energized, the time delay switch 42 will close to energize the SS relay and to hold it temporarily closed, as described above. At the same time the heater element 67 of the panel unit time delay means is energized from the socket 17 through the heater unit 67 to the socket 18 and through the time delay switch 42 to the other side of the line.

The panel unit time delay device provides for a purge period and can be adjusted for any desired purge interval. As long as the time delay switch 66 is open the valves will not be opened, but the burner motor 109 will be energized through a circuit from the common lead 102 to the terminal T-2 to the socket S1-7 to the socket S2-8 to the terminal T-6 and through the jumper to the terminal T-8. From the terminal T-8 the circuit goes through the closed contacts SS11 and SS12 of the relay to the socket S1-3 and the other side of the line. Thus the burner motor will be running to circulate air through the furnace and purge any unburned fuel therefrom so that the furnace is in a safe condition for lighting.

When the time delay switch 66 closes, the lock-out relay coil 68 will be energized through a circuit from the socket 21 and socket 17 through the coil 68 and the switch 66 to the socket 18 and through the time delay switch 42 in the circuit described above to the other side of the line. Energizing the lock-out coil 68 causes power to be supplied to the pilot valve and ignition transformer from the common lead 102 to the terminal T-1 to the socket S1-5 through the switch contacts 74 and 75 to the socket S1-7 to the socket S2-8 to the terminal T-6 through the jumper to the terminal T-8 and through the relay switch contacts SS11 and SS12 to the socket S1-3 and the other side of the line. At this time fuel will be supplied through the pilot valve, and the ignition transformer will be energized to light the fuel.

Since the SS relay is energized through the time delay switch 42 if there is any failure of ignition the SS relay will be de-energized to open the circuit through the pilot valve and ignition transformer thereby shutting down the apparatus. However, if flame is established the tube 30 will be made conductive to energize the relay F.

Energizing of the F relay opens the main fuel valve through a circuit from the common return line 102 through the valve 108 to the terminal T-5 through the relay contacts F-7 and F-8 to the terminal T-8 through the relay contacts SS11 and SS12 and to the socket S1-3 and the other side of the line. Therefore, the main fuel valve will be opened to establish the main burner flame.

At the same time the reset relay 69 is energized from the socket 21 to socket 17 through the relay 69 through contacts 76 and 77 to the socket S1-3 to the terminal T-7 through the relay contacts F-4 and F-5 to socket S2-2 and from there directly to the socket 18 and back to the other side of the line through the time delay switch 42. It will be noted that the lock out relay 68 is also energized as long as the two time delay switches 42 and 66 are closed so that there will be an overlap between ignition and opening of the main valve. Whenever either of the time delay switches opens the lock-out relay 68 is de-energized allowing the reset relay 69 to return the switches 71 to 77 to their initial condition ready for a subsequent operation. This will open the contact 76 and 77 to de-energize the reset relay so that it does not remain energized except when needed. The system is now in condition to relight in the event the flame extinguishes for any reason.

The manual switches 78 and 79 provide for manual resetting whenever desired or in the event the lock-out relay should be deenergized and the flame is not established so that the resetting relay is not energized. Opening of the manual switch 78 interrupts the circuit through the SS relay and closing of the switch 79 completes a circuit through the resetting relay from the socket 17 through the reset coil 69, manual switch 79, socket S2-6 through the relay contacts F-9 and F-10 to the socket S1-3 to the other side of the line. Thus, in the event the flame is not established after the lock-out relay has been energized, it is necessary to use the manual push button to reset the relay before another attempt to light the burner can be made.

A third desirable control combination can be produced by plugging in the panel unit of Figure 4 in conjunction with the external wiring circuit of Figure 5. This circuit provides for pre-ventilation or purging before each lighter attempt with manual control of ignition. As soon as power is supplied to the system, the motor 81 and clutch 82 will be energized through a circuit from the socket 21 to socket 17 through the motor and clutch and the normally closed switch 83 through the relay contacts 87 and 88 to the socket S2-6 and from there through the relay contacts F-9 and F-10 to the socket S1-3 and the other side of the line. The motor will continue to operate until the cam thereon throws the switch 83 to its lower position, as seen in Figure 4. The motor 81 also functions to allow time for purging of the furnace by the circulation of air therethrough either naturally or by suitable blower means to insure that any fuel remaining in the furnace will be removed before a flame is present.

When the switch 83 is moved down, a circuit will be completed through the time delay heater 43 from the socket 21 to socket 17 to contact TD-3 through the heater to contact TD-2 to the socket S2-7 through the switch 83 and the remainder of the circuit as above described to energize the heater 43. After an appropriate interval the time delay switch 42 will close to energize the SS relay and to retain it energized for a predetermined interval as above described. At this time the red signal light 44 is lighted, and the alarm 111 may be energized to indicate to the operator that the system is in condition for starting of the fire. The red signal light circuit is from the socket 21 through the signal light to the terminal T-4 to the socket S2-3 to the socket S2-4 through the contacts SS5 and SS6 and the contacts F—6 and F—7 to the terminal T—8 and through the contacts SS11 and SS12 to the socket S1—3 and the other side of the line. The alarm is energized from the common lead 102 through the alarm terminal T—4 and the remainder of the red signal light circuit described above.

At this time the operator is informed that the system is ready to be ignited, and he can effect the ignition by operating the manual switches 93—98. The pilot valve 107 is energized through a circuit from the common lead 102 through the pilot valve to the terminal T—2 to the socket S1—7 through the terminal block 85 and switch contacts 96 and 98 to the socket S1—6 through the relay contacts F—3 and F—4 to the socket S2—2 to the socket S2—8 to the terminal T—6 through the jumper to terminal T—8 and through the relay contacts SS11 and SS12 to the socket S1—3 and the other side of the line.

At the same time the relay 86 is energized through a circuit from the socket 21, socket 17, the contacts 90 and 91, the connector block, the switch contacts 96, 97 and 98, the socket S1—6, the relay contacts F—3 and F—4, the socket S2—2, the socket S2—8, the terminal T—6 through the jumper to terminal T—8 and through the relay contacts SS11 and SS12 to the socket S1—3 and the other side of the line.

Energizing of the relay 86 will open the contacts 87 and 88 and will interrupt the circuit through the time delay heater 43 so that it will start to cool. Therefore, ignition must be established before the heater cools and the switch 42 opens or the SS relay will be de-energized and it will be necessary to go through the complete cycle again.

If flame is established the F relay will be energized through the tube 39 to complete a circuit to the main fuel valve from the common lead 102 through the valve 108 to the terminal T—5 and through the relay contacts F—7 and F—8, SS11 and SS12, as described above. Simultaneously, the red and green signal lights are both de-energized through opening of the contacts F—1 and F—2 to de-energize the green signal light 45 and opening of the contacts F—6 and F—7 to de-energize the red signal light 44.

The manual switch employed is of the type which will remain in either position in which it is placed. If there should be a flame failure, the F relay will be de-energized to return to the position illustrated in Figure 1 so that the fuel valve will be closed, the signal lights will be relighted, and the alarm will be energized. This indicates to the operator that the flame has become extinguished, and he may then pull outward on the manually operable switch to return the manual switches to the position shown in Figure 4. At this time the system is ready to begin another cycle of operations, as described above, to attempt a relighting, it being noted that in each such attempt the system is first purged before either the pilot valve or the main valve can be opened.

Various other control combinations can be produced with the system as described by bringing together different types of panel or program units with different external circuits connected to the same universal chassis. Therefore, while three particular combinations have been described in detail, it is not intended that these shall be taken as a definition of the limits of the scope of the invention, reference being had for this purpose to the appended claims.

It will be seen from the foregoing that functions common to a plurality of different desired burner controls have been segregated and grouped into a unitary chassis assembly while the remainder of the functions of the different controls have been incorporated into separate panel units which may be individually and detachably connected to the chassis to form any one of the desired controls. Thus, the chassis unit has mounted thereon a flame detector, the tube 39 which is adapted for connection to the flame sensing electrode 41 at the burner, the flame relay F controlling the main fuel valve 108 and energized in response to actuation of the flame detector, and a device for checking false operation of the flame relay including the safe start relay SS and the timing element TD. Each panel unit then carries control elements which determine the type of control desired such as manual or automatic ignition and the sequence of control operations.

In the operation of all the controls, the time delay heater 43 is energized in response to a call for heat to initiate the proving operation for checking the flame relay. The energizing circuit for the heater includes the normally closed flame relay switch contacts F—9 and F—10 which are opened to deenergize the heater in the event that the flame relay is actuated prematurely. If the flame relay is not so actuated, the time delay switch TD—42 will close a predetermined time after energization of the heater 43 to energize the safe start relay SS. Switch contacts SS11 and SS12 and F—7 and F—8 cooperate to control the main fuel valve 108 and to energize the latter only when both the safe start and flame relays are energized. Other switches on these relays are connected to ignition control elements on the panel unit and are closed to complete circuits to these elements for rendering the same effective to control the ignition of the burner when the safe start relay is energized and the flame relay is deenergized.

The control elements of the panel unit shown in Fig. 2 include the switch actuating motor 46, the switches 48—52 controlled thereby, and manually actuated switches 53 and 54. When this unit is connected to the chassis unit, the time delay heater 43 is energized directly through the switch 104 which is closed in response to a call for heat. Then, when the switch 42 is closed to energize the safe start relay, the cycling switch control motor 46 is energized and is thereby rendered effective through the normally open contacts SS11 and SS12 and the normally closed flame relay contacts F—6 and F—7. These same contacts are also in the energizing circuit including the ignition switch 48 for the pilot valve 109 and the igniter transformer so that the ignition switch is effective to control the pilot valve and the igniter transformer when the safe start relay is energized and the flame relay is deenergized, but is disabled when either the safe start relay is deenergized or the flame relay is energized. The other switches on the panel unit of Fig. 2 are interconnected with switches on the flame and safe start relays to control the remainder of the cycle including stopping of the motor 46 before the end of one revolution and sounding of the alarm 117 if ignition fails and manual reenergization of the motor for completion of the one revolution and resetting the switches 48 to 52 at their starting positions.

In the panel unit shown in Fig. 3, the control elements include the second time delay device 65 for timing a purging operation, the lock out relay 68 whose switches control the ignition operation, a reset relay 69, and the manual switches 78 and 79 for energizing the reset relay 69 if ignition fails. Here again, when the panel unit is connected to the chassis unit, the control elements of the unit are connected through flame relay and safe start relay switches which are actuated to render the control elements effective when the safe start relay is energized and the flame relay is deenergized.

The control elements of the panel unit of Fig. 4 include the switch actuating motor 81, the relay 86 and its associated switches 87—92, and the manually actuated switches 93–97. When this panel unit is connected to the chassis unit, the time delay heater 43 is energized in response to a call for heat indirectly through the motor controlled switch 83 after the motor has been energized by closure of the external temperature responsive switch 104, the time delay after closure of the switch 104 and before closure of the switch 83 being utilized to effect a purging operation. After the lapse of a predetermined time interval following energization of the time delay heater 43, the safe start relay is energized as in all of the different controls assuming that the flame relay is not prematurely energized. Upon energization of the safe start relay, switches thereon are actuated to sound the alarm as an indication that it is time for manual ignition and to render the push button ignition switches effective to complete the circuits to the pilot fuel valve and the igniter transformer through normally closed flame relay switch contacts. Thus, the flame and safe start relays jointly control the manual switches to render the latter effective when the flame relay is deenergized and the safe start relay is energized and to disable the manual switches when either the flame relay is energized or the safe start relay is deenergized.

As described above, actuation of the manual switches on the panel unit of Fig. 4 results in energization of the lock out relay 86 and opening of the switch contacts 87 and 88 in the circuit of the heater 43 so that the latter is deenergized. After a predetermined time interval, the switch 42 will open to deenergize the safe start relay provided the ignition attempt has failed. The time delay device TD then performs two functions, that of providing a proving period for heating of the tube 30 and checking false operation of the flame relay and that of limiting the time interval during which manual ignition must take place before shutdown.

What is claimed is:

1. Control apparatus comprising a chassis unit having a plurality of wiring terminals and a plurality of detachable socket type connectors, relays on the chassis unit connected in circuit with certain of the terminals and connectors, switches controlled by the relays and controlling circuits to certain of the terminals and connectors, a time delay device, an energizing circuit for the time delay device including a normally closed switch which is opened by one of the relays when it is energized, a switch closed by the time delay device connected to a second relay to energize it, an external device to be controlled connected to certain of the terminals which are also connected to a normally open switch on the second relay to be energized when the second relay is energized, an electron discharge tube having an output circuit connected to said one of the relays to control energization of said one of the relays, means responsive to a condition affected by said external device to control the tube, a panel unit having a plurality of detachable connectors to interfit with the connectors on the chassis unit, switches on the panel unit in circuit with certain of the connectors thereon to control circuits on the panel and chassis units, motor means on the panel unit to operate the switches thereon, an energizing circuit for the motor means including a normally closed switch which is opened by operation of the motor means after a predetermined time, another of the switches on the panel unit being a normally open switch which is connected in said energizing circuit for the time delay device and which is closed by operation of the motor after a predetermined time.

2. In apparatus for controlling a fuel burner, the combination of, a chassis unit having a plurality of electrically energizable devices mounted thereon to form a self contained assembly, said devices including at least a flame detector adapted to be connected to a flame sensing element at the burner and to be activated when a flame is present, a flame relay connected to and energized in response to activation of said flame detector, and a device for checking false actuation of said flame relay including a safe start relay and a timing element energized in response to a call for heat and operable to energize the safe start relay after the lapse of a predetermined time interval and to deenergize the relay a predetermined time after deenergization of the element, said flame relay having a switch in the energizing circuit for said timing element actuated by the relay to disable the circuit when the relay is energized and said flame relay and said safe start relay having switches cooperating to complete a circuit for opening a main fuel valve when both relays are energized, and a panel unit detachably connected to said chassis unit and having an ignition and pilot valve control switch means and a switch controlling motor thereon, said flame relay having a switch in the energizing circuit for said motor and operable to disable the latter when the flame relay is energized and both of said relays having switches connected to said panel switch means and cooperating to render the latter effective to energize an igniter and activate a pilot fuel valve when the flame relay is deenergized and the safe start relay is energized and to render the panel switch means ineffective when either the flame relay is energized or the safe start relay is deenergized.

3. In apparatus for controlling a fuel burner having an igniter, a pilot fuel valve, and a main fuel valve, the combination of, a chassis unit having a plurality of electrically energizable devices mounted thereon to form a self contained assembly, said devices including at least a flame detector adapted to be connected to a flame sensing element at the burner and to be activated when a flame is present, a flame relay connected to and energized in response to activation of said flame detector, and a device for checking false actuation of said flame relay including a safe start relay and a timing element energized in response to a call for heat and operable to energize the safe start relay after the lapse of a predetermined time interval and to deenergize the relay a predetermined time after deenergization of the element, said flame relay having a switch in the energizing circuit for said timing element actuated by the flame relay to disable the circuit when the flame relay is energized and said flame relay and said safe start relay having switches cooperating to complete a circuit for opening the main fuel valve when both relays are energized, and a panel unit detachably connected to said chassis unit and having an ignition control switch means thereon operable when actuated to energize the igniter and activate the pilot valve, said relays having switches connected to said ignition control switch means and cooperating to render the latter effective to energize the igniter and activate the pilot fuel valve when the flame relay is deenergized and the safe start relay is energized and to render the ignition switch means ineffective when either the flame relay is energized or the safe start relay is deenergized.

4. In apparatus for controlling a fuel burner, the combination of, a chassis unit having a plurality of electrically energizable devices mounted thereon to form a self contained assembly, said devices including at least a flame detector adapted to be connected to a flame sensing element at the burner and to be activated when a flame is present, a flame relay connected to and energized in response to activation of said flame detector, and a device for checking false actuation of said flame relay including a safe start relay and a timing element energized in response to a call for heat and operable to energize the safe start relay after the lapse of a predetermined time interval and to deenergize the relay a predetermined time after deenergization of the element, said flame relay having a switch in the energizing circuit for said timing element actuated by the relay to disable the circuit when the relay is energized and said flame relay and said safe start relay having switches cooperating to complete a circuit for opening a main fuel valve when both relays are energized, and a panel unit detachably connected to said chassis unit and having program control elements thereon including switches operable when rendered effective to control the sequence of a burner lighting cycle including energization of a pilot valve and an igniter, said relays having switches connected to said control elements and cooperating to render the latter effective when the flame relay is deenergized and the safe start relay is energized and to render the control elements ineffective when either the flame relay is energized or the safe start relay is deenergized.

5. In apparatus for controlling a fuel burner, the combination of, an igniter, an ignition circuit for energizing said igniter, a manually operable switch in said ignition circuit, a flame relay energized in response to a flame at the burner and deenergized when no flame is present, a safe start relay, switches actuated by said relays and connected in said ignition circuit to render said manual switch effective to control the igniter when the flame relay is deenergized and the safe start relay is energized and to render the manual switch ineffective when either the flame relay is energized or the safe start relay is deenergized, a time delay device connected to said safe start relay and operable to energize the latter a predetermined time interval after energization of the device and to deenergize the relay a second predetermined time interval after the device is deenergized, and an energizing circuit for said time delay device including a normally open switch closed in response to a call for heat, a normally closed switch opened in response to actuation of said flame relay, and a normally closed switch opened in response to actuation of said manual switch.

References Cited in the file of this patent
UNITED STATES PATENTS

| Number | Name | Date |
|---|---|---|
| 2,003,624 | Bower | June 4, 1935 |
| 2,425,589 | Aubert | Aug. 12, 1947 |
| 2,575,289 | Nycum et al. | Nov. 13, 1951 |
| 2,616,491 | Nycum | Nov. 4, 1952 |
| 2,624,399 | Thomson et al. | Jan. 6, 1953 |